United States Patent Office 3,297,618
Patented Jan. 10, 1967

3,297,618
STABLE AQUEOUS EMULSIONS OF ETHYLENE-VINYL CHLORIDE MALEATE COPOLYMERS
Dietrich Glabisch, Leverkusen, and Herbert Bartl, Cologne-Stammheim, Germany, assignors to Farbenfabriken Bayer Aktiengesellschaft, Leverkusen, Germany, a German corporation
No Drawing. Filed Jan. 6, 1964, Ser. No. 336,016
Claims priority, application Germany, Jan. 12, 1963, F 38,761
4 Claims. (Cl. 260—29.6)

The present invention relates to stable, aqueous emulsions of specific ternary copolymers of ethylene, vinyl chloride and maleic acid semi-esters which are free from usual emulsifiers as well as a process for preparation of such ethylene copolymers. The term "usual emulsifiers" as used herein is understood to mean low molecular weight substances which are not capable of copolymerizing and which, owing to special structural features, are capable of micelle formation in aqueous solution and are able to form more or less stable dispersions of substances which are insoluble or sparingly soluble in water. Typical structural features of such emulsifiers are a strongly hydrophobic molecular group such as a long chained hydrocarbon radical containing about 12 to 20 carbon atoms as well as a strongly hydrophilic group such as a sulphonate, sulphate or quaternary ammonium group.

Processes for the copolymerization of ethylene with vinyl chloride in an aqueous medium without the addition of the usual emulsifiers have already been described, but no one has so far succeeded in preparing stable aqueous emulsions of such copolymers obtained by these processes. For example, according to the process of U.S.A. patent specification No. 2,422,392 or British patent specification No. 579,883, ethylene-vinyl chloride copolymers, which can be filtered off immediately, are obtained. In these cases, no emulsions can be obtained even when a third monomer such as acrylic acid is used.

The polymerization of ethylene in an aqueous medium, in which the pH may be adjusted to a value above 7 by adding phosphate buffers, has also already been described. In this case, it is possible to use vinyl chloride as comonomer, if desired with the addition of another comonomer. However, in this process again no emulsions are obtained and the product is separated from the aqueous phase by filtration.

It has already been pointed out in U.S.A. patent specification No. 2,497,291 that ethylene-vinyl chloride copolymers may in some cases be obtained as dispersions in water without the addition of emulsifiers. Owing to the absence of any emulsifying components, such dispersions are extremely unstable.

It has now been found that stable, aqueous emulsions of special ternary ethylene copolymers may be obtained without using the usual emulsifiers, by polymerisation under pressure in an aqueous medium with the aid of water-soluble free radical forming substances, if ethylene is copolymerized with vinyl chloride in the presence of a semi-ester of maleic acid with an aliphatic monohydric alcohol (by which term we intend cyclo-aliphatic alcohols to be included) containing a maximum of 6 carbon atoms in the alcohol component, or their alkali salts, in such a manner that the copolymer contains at least 50 and not more than 70 percent by weight of vinyl chloride and at the same time between 2 and 10% by weight of the said maleic acid semi-ester, incorporated by polymerisation.

In the process according to the invention, ethylene is copolymerised in an aqueous medium with vinyl chloride in the presence of 2 to 10 parts of such a maleic acid semi-ester containing not more than 6 carbon atoms in the alcohol component for every 50 to 70 parts of vinyl chloride, at a pH between 4 and 8.

By the present process, it has become possible to prepare copolymers of ethylene with vinyl chloride in the form of extremely stable, aqueous emulsions, i.e., emulsions which can be stored for at least ¼ year but in most cases for much longer.

Moreover, the copolymers obtained by the process according to the invention surprisingly have a very regular structure of copolymerised monomer units in the sense of an alternating structure. From analytical data, especially fractionated precipitations, it is evident that ethylene and vinyl chloride polymerise in a molar ratio of 1:0.6 to 1:1. Alternating copolymers are obtained even if, as may be seen from the examples, the monomer ratio varies continuously over the whole polymerisation time.

According to the present process, semi-esters of maleic acid and aliphatic or cycloaliphatic monohydric alcohols which contain a maximum of 6 carbon atoms in the alcohol component are used as special third copolymer components in addition to ethylene and vinyl chloride. Preferably, semi-esters of maleic acid and straight chained saturated aliphatic monohydric alcohols containing 3 to 6 carbon atoms, e.g., propanol, butanol, pentanol, hexanol or cycloaliphatic alcohols such as cyclohexanol are used for this purpose. The said acid esters are preferably used in the form of their salts, especially their alkali metal or ammonium salts. It is, of course, also possible to use mixtures of the aforesaid esters.

The quantities of maleic acid semi-esters to be used are limited by the nature of the copolymer to be prepared. It is necessary to use as little as possible in order that the waterproofness of the polymers obtained, and of the coatings that can be formed from the emulsions, is not impaired. On the other hand, as has been found, a minimum of copolymerized maleic acid semi-ester units is necessary in order to ensure high stability of the polymer emulsions. Consequently, between 2 and 10% by weight, preferably 3 to 8% by weight of said maleic acid semi-esters should be copolymerised.

The ratio of water to monomeric vinyl chloride should preferably lie between the limits 2:1 and 20:1.

The polymerisation must be released by water-soluble substances which form free radicals, especially inorganic percompounds such as potassium-, sodium- or ammonium peroxydisulphates, perborates, hydrogen peroxide or others. Moreover, the said water-soluble peroxides may also be used in the form of Redox systems, i.e., in combination with reducing agents, in known manner. Suitable reducing agents are, for example, sodium-pyrosulphite or -bisulphite, sodium-formaldehyde-sulphoxylate or triethanolamine. Initiator quantities of 0.1 to 3% by weight calculated on the polymer are sufficient for the preparation of stable emulsions.

The copolymerisation according to the present process should take place within a pH range of 4 to 8. Since, when alkali peroxydisulphates are used, the hydrogen ion concentration of the reaction medium is shifted towards lower pH values in the course of polymerisation, it is often advantageous, for the purpose of obtaining high yields, to add buffer substances to the reaction medium to prevent a fall in pH of the medium to a strongly acid region. Suitable buffers for this purpose are, for example, mixtures of primary and secondary potassium phosphate.

Although the copolymerisation according to the present process may be carried out at ethylene pressures greater than 10 atmospheres above atmospheric pressure, it is preferably carried out at pressures between 100 and 300 atmospheres above atmospheric pressure. If necessary, pressures greater than 300 atmospheres above atmospheric pressure may also be used. The temperature depends on the initiator or on the initiator system used in each particular case. It is preferable to employ polymerization temperatures below 100° C., especially between 50 and 85° C.

The present polymerization is preferably carried out up to a yield of about 80%.

The process may be carried out either discontinuously or continuously. In the continuous method, an aliquot part of the aqueous phase and of the monomers is first introduced, and further quantities of the aqueous phase and of the monomers are then introduced into the reaction chamber through pressure gates in amounts according to the progress of polymerization. Furthermore, solubilising agents may be added to the aqueous phase. For this purpose, it is preferable to use water-soluble, organic solvents having low transfer constants, such as tertiary butanol. The quantity, for example, of tertiary butanol, should preferably not exceed 20 volumes percent of the aqueous phase.

The emulsions of ternary ethylene copolymers obtainable by the present process have a surprisingly high stability to storage, i.e., ¼ year and more. Emulsions of these copolymers are at the same time distinguished by especially good stability to changes in pH which may lie within the region of 3 to 13. The emulsions may easily be concentrated by the usual methods to solids contents of about 60%. Such concentrates will not sediment even when stored for more than 6 months; this property also indicates the high stability of the emulsions prepared according to the invention.

Coatings obtained by drying the polymer emulsions produced by the present process (e.g. in the heat on glass) are surprisingly strongly hydrophobic and completely clear and transparent. This transparency is maintained even on contact with water and aqueous liquids.

The copolymer emulsions according to the invention are therefore particularly suitable for coating or impregnating substrates such as wood, glass, metal, paper, fibrous materials (textiles), leather, etc.

Moreover, these emulsions are also suitable for use in the field of adhesives if they form products of a sufficiently adhesive nature when dried.

If it is desired to isolate the polymers, this may be done, for example, by coagulating the emulsion with strong mineral acids or concentrated electrolyte solutions. Colourless, clear transparent, soft, stretchable and elastic polymers whose physical properties depend on the proportions of the components are thereby obtained. The copolymers may also be used directly in certain fields, e.g., in combination with compatible polymers, and in the form of solution in suitable solvents, e.g., toluene or xylene, for coating, impregnating, painting, etc.

The parts given in the following examples are parts by weight unless otherwise indicated.

Example 1

A mixture of: 7 parts potassium peroxydisulphate, 13.85 parts maleic acid propyl semi-ester, 70 parts 1N-potassium hydroxide, 100 parts of an aqueous buffer solution containing 16.575 g. $K_2HPO_4$ and 0.681 g. $KH_2PO_4$ per litre and having a pH of 8.2, 530 parts distilled boiled water, and 80 parts tertiary butanol is introduced into a stainless high pressure autoclave equipped with stirrer. After rinsing three times with ethylene at a pressure of about 20 atmospheres above atmospheric pressure, 90 parts by weight of vinyl chloride are introduced and ethylene is then introduced under pressure until a pressure of about 70 atmospheres above atmospheric pressure is reached. After heating to 70° C. for about 30 minutes, the pressure rises to about 130 atmospheres above atmospheric pressure. More ethylene is then introduced under pressure until a pressure of 200 atmospheres above atmospheric pressure is reached and the mixture is then polymerized with thorough stirring for 18 hours, the pressure drop being compensated hourly by the introduction of more ethylene to a pressure of 200 atmospheres above atmospheric pressure. Altogether, a quantity of ethylene corresponding to a pressure drop of 214 atmospheres above atmospheric pressure is used up. After cooling and releasing the pressure, 1000 parts of a stable emulsion completely free from coagulate and having a pH of 5 and a solids content of 17.4% by weight are obtained. The polymer obtainable by coagulation contains 32.8% of chlorine and 2.2% of oxygen, corresponding to 57.7 parts by weight of vinyl chloride and 5.4 parts by weight of semi-ester.

When dried, e.g., on glass, the emulsion forms clear, transparent films which are not dulled when wetted with water.

Example 2

A mixture of: 7 parts of potassium peroxydisulphate, 13.85 parts maleic acid propyl semi-ester, 70 parts 1N-potassium hydroxide, 100 parts buffer solution according to Example 1, 610 parts distilled boiled water is introduced into a stainless high pressure autoclave with stirrer. After rinsing three times with ethylene at a pressure of about 20 atmospheres above atmospheric pressure, 100 parts by weight of vinyl chloride are introduced and then copolymerized at an ethylene pressure of 200 atmospheres above atmospheric pressure (see Example 1). 2, 4, 5 and 6 hours after the onset of polymerization, a further 50 parts by weight of vinyl chloride are pumped into the reaction mixture each time, the pressure thereby rising temporarily to about 230 atmospheres above atmospheric pressure. After 8 hours, the reaction is broken off and the reaction mixture is cooled and the pressure is released. 1085 parts by weight of a coagulate-free, completely stable, 26.4% emulsion of pH=5 are obtained, this emulsion forming colourless, clearly transparent, hydrophobic films when dried at 80° C. The polymer contains 68% by weight of vinyl chloride, 4% by weight maleic acid propyl semi-ester and 28% by weight of ethylene; the molar ratio ethylene:vinyl chloride is 1:1.09.

If, on the other hand, polymerization is carried out with an equivalent quantity (8.6 parts) of maleic acid anhydried (neutralized with 70 parts 1N–KOH), an unstable white dispersion which, when painted and dried, forms strongly hydrophilic colourless films which immediately become white when wetted with water, is obtained in addition to small quantities of coagulate. The polymer contains 86% by weight vinyl chloride, 1.63% by weight maleic acid and 12.37% by weight ethylene; the molar ratio ethylene:vinyl chloride is 1:3.11.

These facts clearly show that when semi-esters are used, polymerization is almost alternating, but not when maleic acid is used.

Example 3

Polymerization is carried out as in Example 2, except that 5 parts by weight of ammonia peroxydisulphate, 14.4 parts by weight of maleic acid ethyl semi-ester, 100 parts by weight of 1N-potassium hydroxide, 100 parts by weight of buffer solution (according to Example 1) and 580 parts by weight of distilled boiled water are used, and 1095 parts by weight of a 27.8% emulsion which has good film-forming properties are obtained after 10 hours. The copolymer which can then be isolated contains 67.3% by weight vinyl chloride, 3.7% by weight maleic acid semi-ester and 39% by weight ethylene.

Example 4

If 17.2 parts by weight of maleic acid-n-butyl semi-ester are used instead of 14.4 parts by weight of maleic acid ethyl semi-ester in Example 3, a 27.2% emulsion is obtained.

Example 5

Polymerization is carried out as in Example 2, except that 15 parts by weight of maleic acid-n-hexyl semi-ester, previously neutralized with 75 parts by weight of 1N- potassium hydroxide, were used instead of maleic acid-n-propyl semi-ester. 1105 parts by weight of a 28.2% emulsion which has good film-forming properties are obtained.

Example 6

If polymerization is carried out as in Example 2, but with the use of 17.5 parts of maleic acid cyclohexyl semi-ester instead of maleic acid propyl semi-ester, a very stable emulsion having a solids content of 24.2% and pH=4.5 is obtained. Films produced from this emulsion are clearly transparent, colorless, have good adhesiveness to glass and are completely hydrophobic.

Example 7

A mixture of 0.865 part potassium peroxy disulphate, 1.71 parts maleic acid propyl semi-ester, 0.606 part potassium hydroxide, 0.205 part secondary potassium phosphate, and 100 parts distilled boiled water is introduced into a stainless high pressure autoclave with stirrer. After rinsing three times with ethylene at a pressure of about 20 atmospheres above atmospheric pressure, 11.7 parts of vinyl chloride are pumped in. Polymerization is then carried out at 70° C., and the ethylene pressure is adjusted to 200 atmospheres above atmospheric pressure (see Example 1). 2½ hours after reaching a temperature of 70° C., a further 21.6 parts of vinyl chloride are pumped in within 4 hours, and the total pressure is maintained at 200 to 220 atmospheres above atmospheric pressure by occasionally introducing more ethylene under pressure. After a total of 13 hours' polymerization, 124 parts of a 30.2%, completely coagulate-free emulsion which can be concentrated to a solids content of 56% by suitable means are obtained. The concentrate is still completely liquid after 6 months and forms neither a coagulate nor a sediment during this time.

Example 8

If increasing quantities of vinyl chloride are copolymerized as in Example 1 at the same ethylene pressure (200 atmospheres above atmospheric pressure), the copolymers will contain increasing quantities of vinyl chloride but the quantity of incorporated vinyl chloride will increase to a much less extent than corresponds to the quantity of monomeric vinyl chloride used.

| Experiment No. | Parts of monomeric vinyl chloride | Weight percent of incorporated— | | Molar ratio, ethylene/ vinyl chloride |
|---|---|---|---|---|
| | | Ethylene | Vinyl chloride | |
| a | 40 | 39.5 | 54.0 | 1:0.61 |
| b | 80 | 33.4 | 56.0 | 1:0.65 |
| c | 90 | 36.9 | 57.7 | 1:0.7 |
| d | 135 | 32.2 | 63.9 | 1:1.13 |
| e | 180 | 28.5 | 67.7 | 1:1.06 |

Fractions of copolymer e obtained by fractional precipitation with benzene/petroleum ether have a constant vinyl chloride content:

| Fraction No.: | Percent vinyl chloride incorporated |
|---|---|
| 1 | 63.0 |
| 2 | 68.5 |
| 3 | 67.5 |
| 4 | 68.2 |
| 5 | 67.7 |
| 6 | 67.0 |

This practically constant vinyl chloride content in all the fractions is surprising since the quantity of monomeric vinyl chloride introduced in experiment e fell continuously while the ethylene concentration was kept practically constant at 200 atmospheres above atmospheric pressure by subsequent compression. An alternating structure of ethylene- and vinyl chloride units may be concluded from this and from the rubber elastic properties of the copolymer.

What we claim is:

1. The process for preparing stable aqueous emulsions of ethylene copolymers, said process consisting essentially of copolymerizing ethylene, 50–70 percent by weight of vinyl chloride and 2–10 percent by weight of a salt of a semi-ester of (1) maleic acid and (2) an aliphatic monohydric alcohol containing up to 6 carbon atoms in an aqueous medium adjusted to a pH between 4 and 8 at elevated pressure in the presence of a water-soluble free radical forming substance.

2. The process of claim 1 wherein said elevated pressure is between 100 and 300 atmospheres above atmospheric pressure and said copolymerization is carried out at a temperature below 100° C.

3. A stable aqueous dispersion of an ethylene copolymer wherein the continuous phase consists essentially of water adjusted to a pH between 3 and 13 and the discontinuous phase consists essentially of a copolymer of ethylene containing 50–70 percent by weight of vinyl chloride and 2–10 percent by weight of a salt of a semi-ester of (1) maleic acid and (2) an aliphatic monohydric alcohol containing up to 6 carbon atoms.

4. The stable aqueous dispersion of claim 3 wherein said aliphatic monohydric alcohol moiety of said semi-ester is a saturated monohydric alcohol containing 3 to 6 carbon atoms.

References Cited by the Examiner

UNITED STATES PATENTS 2,599,123   6/1952   Pinkney _____ 260—78.5

FOREIGN PATENTS 579,883   8/1946   Great Britain.

MURRAY TILLMAN, *Primary Examiner.*

J. ZIEGLER, *Assistant Examiner.*